(12) United States Patent
Kneuper et al.

(10) Patent No.: US 10,718,885 B2
(45) Date of Patent: Jul. 21, 2020

(54) SYSTEM AND METHODS FOR AVIATION WINDS UNCERTAINTY PREDICTION

(71) Applicant: The Boeing Company, Chicago, IL (US)

(72) Inventors: Nils Kneuper, Bergkamen (DE); Matthew Bonbright Hendrian, Aurora, CO (US); Ralf René Shu-Zhong Cabos, Braunschweig (DE)

(73) Assignee: The Boeing Company, Chicago, IL (US)

(*) Notice: Subject to any disclaimer, the term of this patent is extended or adjusted under 35 U.S.C. 154(b) by 818 days.

(21) Appl. No.: 15/235,755

(22) Filed: Aug. 12, 2016

(65) Prior Publication Data

US 2018/0045854 A1    Feb. 15, 2018

(51) Int. Cl.
| | |
|---|---|
| *G01W 1/10* | (2006.01) |
| *G08G 5/00* | (2006.01) |
| *G06N 5/04* | (2006.01) |
| *G06Q 10/04* | (2012.01) |
| *G06Q 50/30* | (2012.01) |

(52) U.S. Cl.
CPC ............. *G01W 1/10* (2013.01); *G06N 5/047* (2013.01); *G06Q 10/047* (2013.01); *G06Q 50/30* (2013.01); *G08G 5/0034* (2013.01)

(58) Field of Classification Search
CPC ....... G01W 1/10; G08G 5/0034; G06Q 50/30; G06Q 10/047; G06N 5/047
See application file for complete search history.

(56) References Cited

U.S. PATENT DOCUMENTS

| | | | | |
|---|---|---|---|---|
| 6,134,500 | A | * 10/2000 | Tang | .................... G06Q 10/047 701/10 |
| 7,877,107 | B2 | 1/2011 | Joung | |
| 8,935,174 | B2 | 1/2015 | Chen et al. | |

(Continued)

OTHER PUBLICATIONS

Lawan et al; "Different Models of Wind Speed Prediction; A Comprehensive Review"; Jan. 2014 (Year: 2014).*

(Continued)

*Primary Examiner* — Regis J Betsch
*Assistant Examiner* — Jeremy A Delozier
(74) *Attorney, Agent, or Firm* — Perman & Green, LLP

(57) ABSTRACT

A wind forecast prediction apparatus includes an historical forecast patterns module configured to generate at least one historical wind forecast pattern and determine a deviation magnitude and a probability of occurrence of the at least one historical wind forecast pattern based on at least one actual wind value; a current wind forecast module; and a wind forecast prediction controller connected to the historical forecast patterns module and current wind forecast module, the wind forecast prediction controller is configured to generate a current wind forecast pattern based on current wind data from the current wind forecast module; and determine a matching historical wind forecast pattern from the at least one historical wind forecast pattern that matches the current wind forecast pattern, where the deviation magnitude and the probability of occurrence of the matching historical wind forecast pattern are combined with the current wind forecast pattern to generate a predicted wind forecast.

20 Claims, 9 Drawing Sheets

(56) References Cited

U.S. PATENT DOCUMENTS

2014/0344209 A1* 11/2014 Fang ............... G06N 7/005
  706/52
2016/0004969 A1    1/2016 Cetinich et al.

OTHER PUBLICATIONS

Cheung, et al. "Recommendations on Trajectory Selection in Flight Planning Based on Weather Uncertainty". SESARWPE Long Term and Innovative Research, Fifth SESAR Innovation Days, Dec. 2015.
"Complexity Challenges in ATM" ComplexWorld, 2016.
Extended European Search Report, EP Application No. 17174468.3, dated Jul. 6, 2017.

* cited by examiner

SYSTEM AND METHODS FOR AVIATION WINDS UNCERTAINTY PREDICTION

FIELD

The aspects of exemplary embodiment generally relate to improving wind forecasts, more particularly, to improving wind forecasts based on historical wind forecasts and historical actual wind values.

BACKGROUND

Large scale weather and wind forecasts, employed, for example, in applications such as aircraft flight planning, nautical navigation and wildfire fighting, are becoming more and more exact and refined. However, there are still airborne wind forecasting issues which must be addressed. Conventional forecasting systems take an ensemble approach to wind and weather forecasting. Ensemble approaches take multiple weather and wind forecasts generated by multiple entities or sources such as the National Weather Service, Met Office (UK weather forecasting service) or other public or private meteorological forecasting services. These conventional forecasting systems result in many different forecasts, some of which can deviate wildly from the others. When used, for example, in the field of aircraft flight plan generation, conventional forecasting systems using ensemble forecasts can result in the prediction of multiple different flights, each corresponding to each ensemble forecast. Each flight plan generated by ensemble forecasts also has contingencies calculated (e.g., extra fuel necessary in case the weather or wind deviates from the forecast). With all of the different contingency fuel calculated, a distribution of the different contingency fuel calculations is used to determine the spread of possible contingency fuel. If the spread is small, conclusions can be drawn that the weather conditions forecasted by the ensemble forecast are not volatile enough to justify an excess amount of contingency fuel to be carried.

Conventional forecasting systems using ensemble forecast techniques are typically computationally expensive to calculate (for example, ensemble forecast systems have to calculate multiple flight plans within the flight planning field). Conventional forecasting systems also cannot gauge explicit uncertainty in the most likely forecast, and are only designed to gauge the spread of potential contingencies. Further, conventional forecasting systems cannot operate with a single forecast, and instead must rely on multiple forecasts. Each ensemble forecast used in conventional forecasting systems is equally probable, but this does not increase the accuracy of any single forecast in particular. Thus, the most likely forecast is not improved by conventional systems using conventional forecasting approaches.

SUMMARY

Accordingly, a system and method, intended to address the above-identified concerns, would find utility.

In one or more aspects of the present disclosure, a wind forecast prediction apparatus includes an historical forecast patterns module configured to generate at least one historical wind forecast pattern and determine a deviation magnitude and a probability of occurrence of the at least one historical wind forecast pattern based on at least one actual wind value corresponding to the at least one historical wind forecast pattern; a current wind forecast module; and a wind forecast prediction controller connected to each of the historical forecast patterns module and the current wind forecast module, the wind forecast prediction controller is configured to generate a current wind forecast pattern based on current wind data from the current wind forecast module; and determine a matching historical wind forecast pattern from the at least one historical wind forecast pattern that matches the current wind forecast pattern, where the deviation magnitude and the probability of occurrence of the matching historical wind forecast pattern are combined with the current wind forecast pattern to generate a predicted wind forecast.

In one or more aspects of the present disclosure, a wind forecast prediction method, the method includes generating at least one historical wind forecast pattern with an historical forecast patterns module; determining a deviation magnitude and a probability of occurrence of the at least one historical wind forecast pattern, with the historical forecast patterns module, based on at least one actual wind value corresponding to the at least one historical wind forecast pattern; generating, with a wind forecast prediction controller, a current wind forecast pattern based on current wind data from a current wind forecast module; determining, with the wind forecast prediction controller, a matching historical wind forecast pattern from the at least one historical wind forecast pattern that matches the current wind forecast pattern; and generating a predicted wind forecast with the wind forecast prediction controller by combining the deviation magnitude and the probability of occurrence of the matching historical wind forecast pattern with the current wind forecast pattern.

In one or more aspects of the present disclosure, a method for generating a wind forecast, the method includes generating at least one historical wind forecast pattern with an historical forecast patterns module, each of the at least one historical wind forecast pattern being based on at least one historical wind forecast from the historical forecast patterns module; determining a deviation magnitude and a probability of occurrence of the at least one historical wind forecast pattern, with the historical forecast patterns module, based on an actual wind value corresponding to each of the at least one historical wind forecasts associated with the at least one historical wind forecast pattern; generating, with controller wind forecast prediction controller, a current wind forecast pattern based on current wind data from a current wind forecast module; determining, with the wind forecast prediction controller, a matching historical wind forecast pattern from the at least one historical wind forecast pattern that matches the current wind forecast pattern; and generating a predicted wind forecast with the wind forecast prediction controller by combining the deviation magnitude and the probability of occurrence of the matching historical wind forecast pattern with the current wind forecast pattern.

BRIEF DESCRIPTION OF THE DRAWINGS

Figure 1:
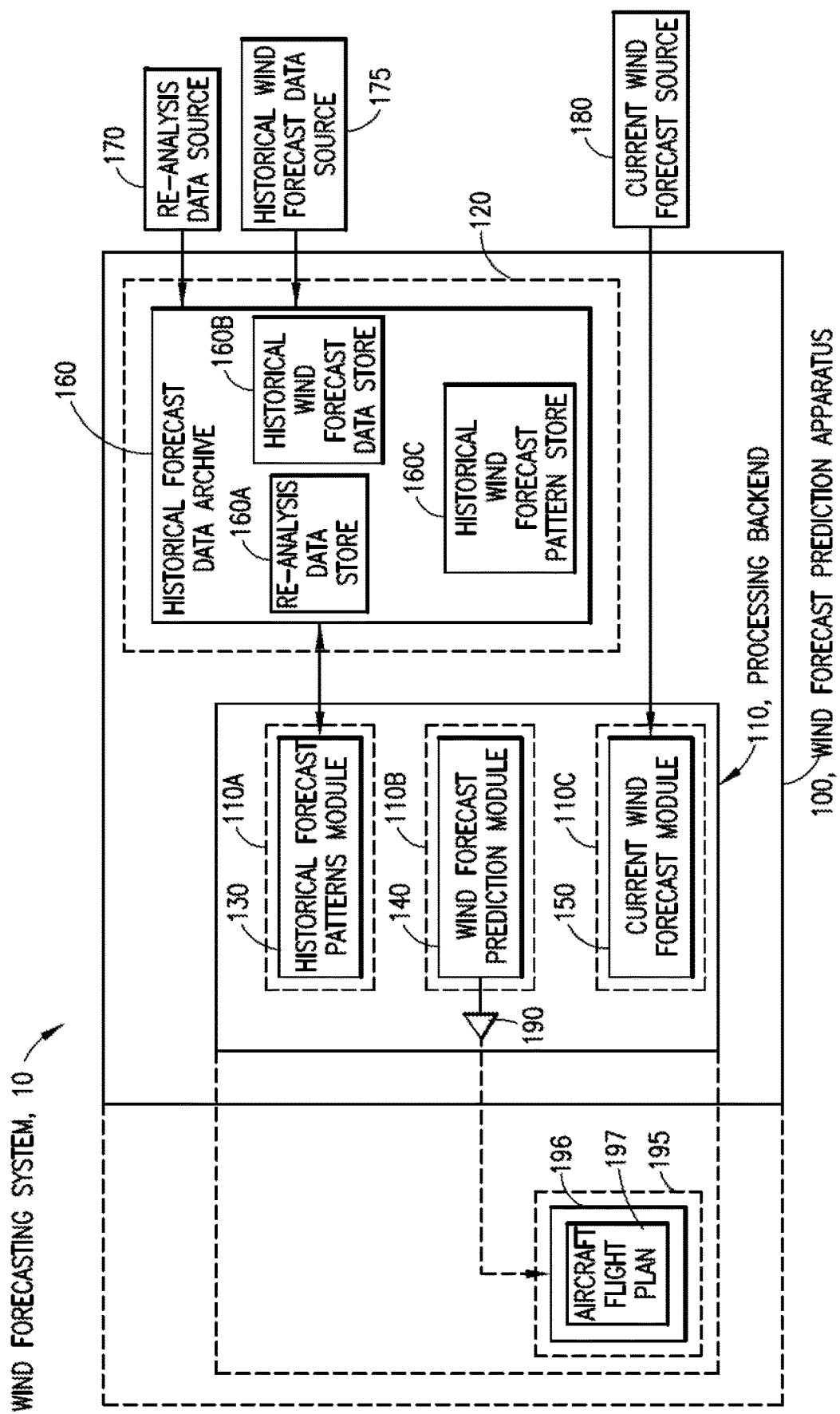
Figure 2:
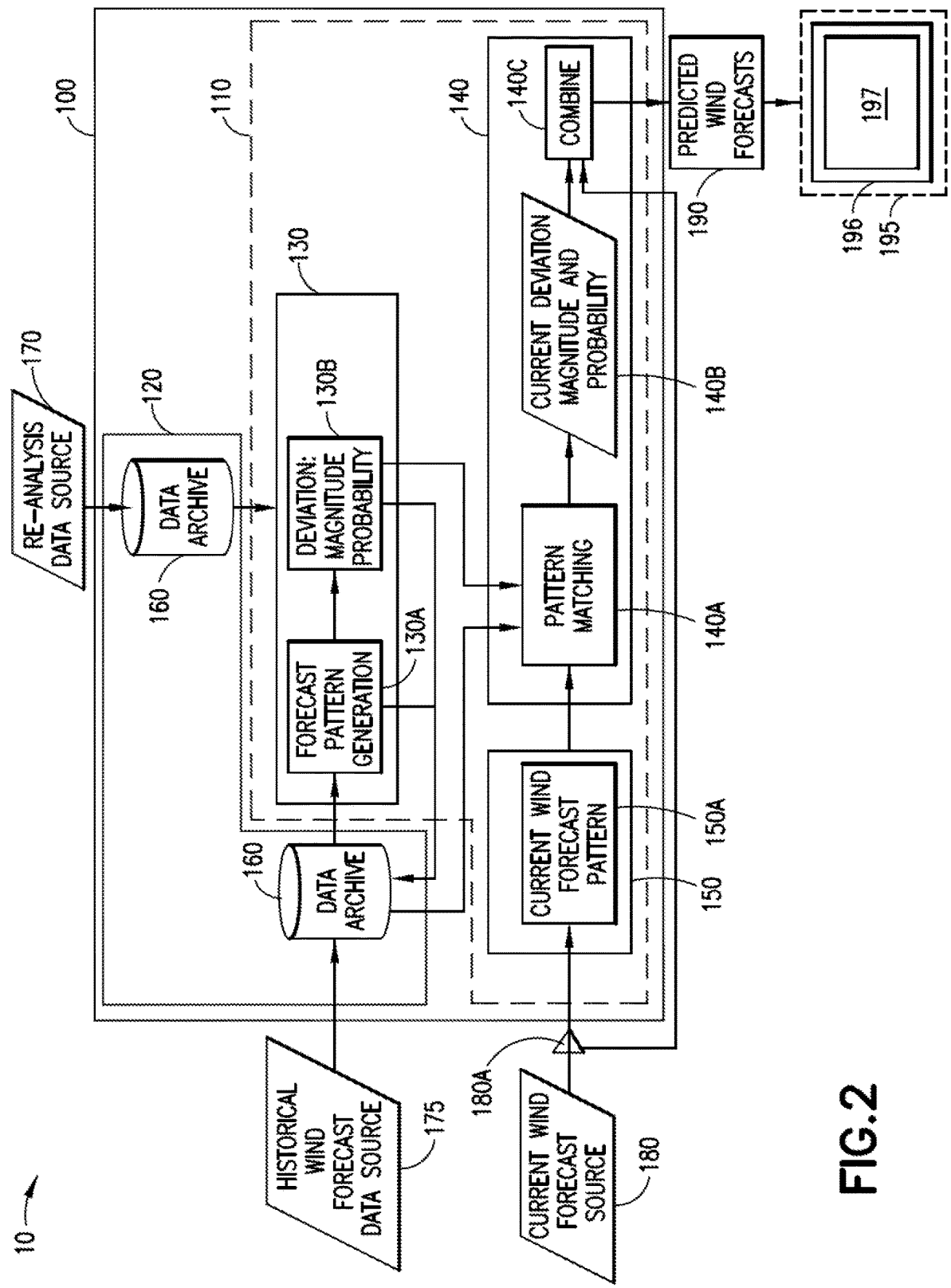
Figure 3:
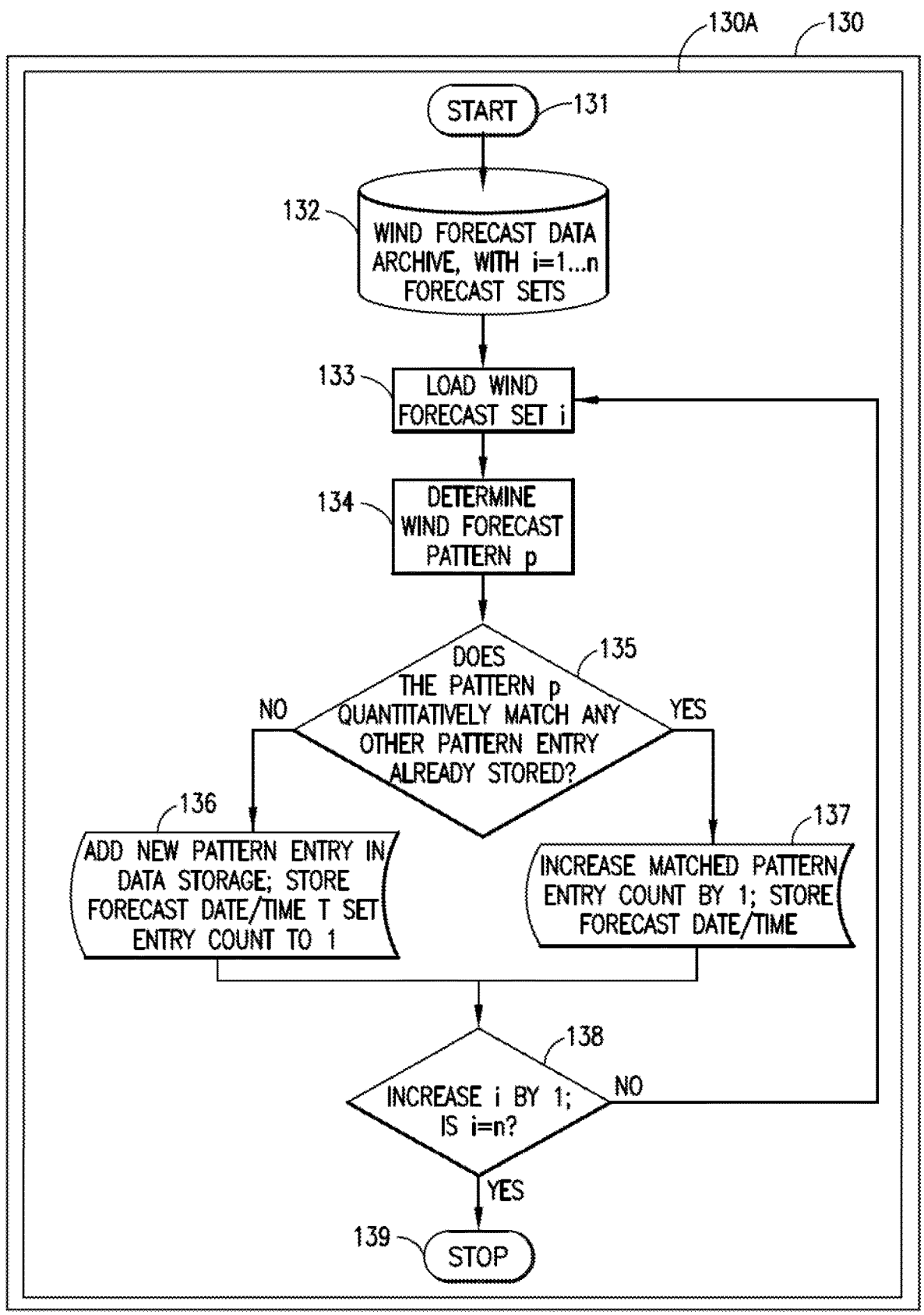
Figure 3A:
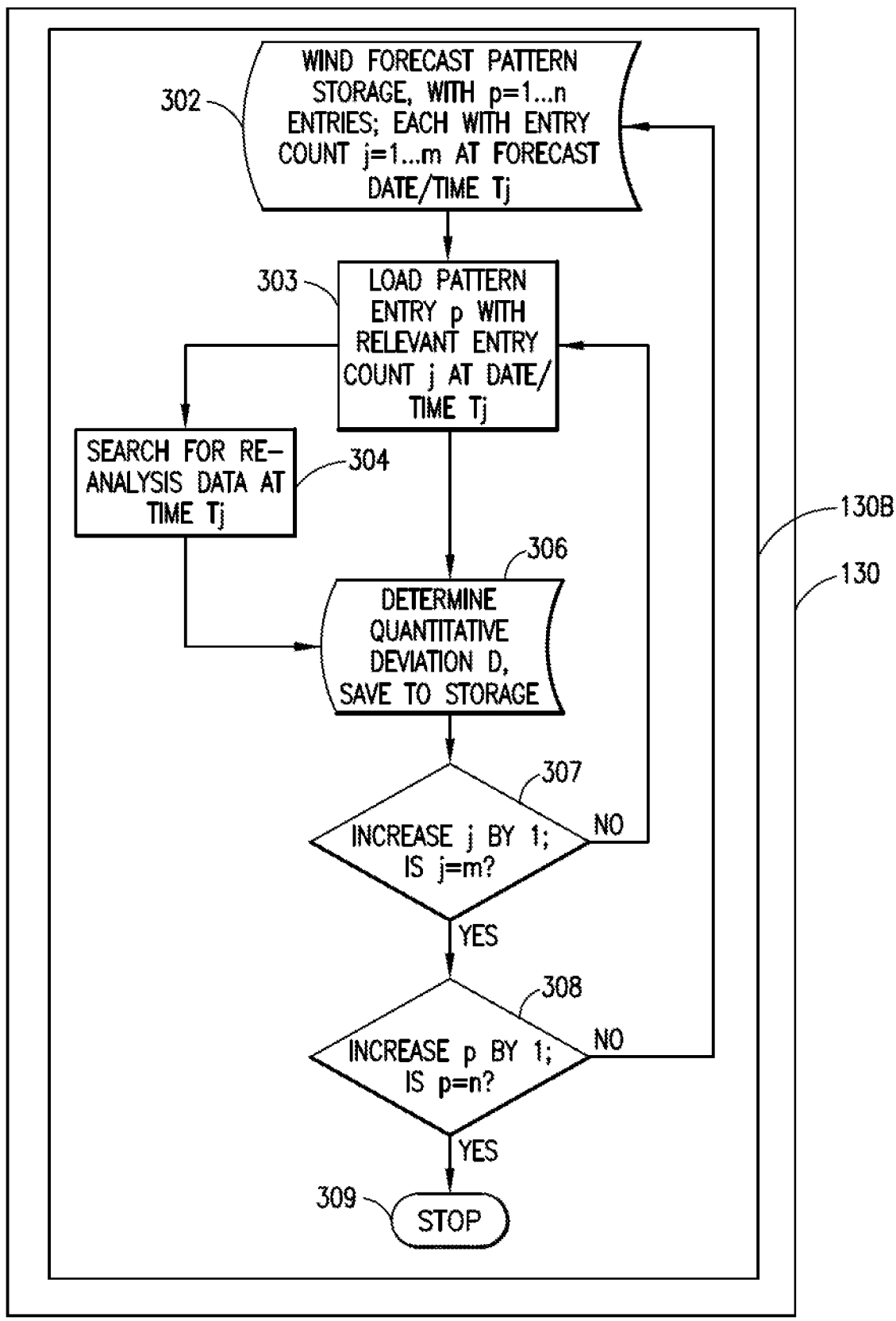
Figure 4:
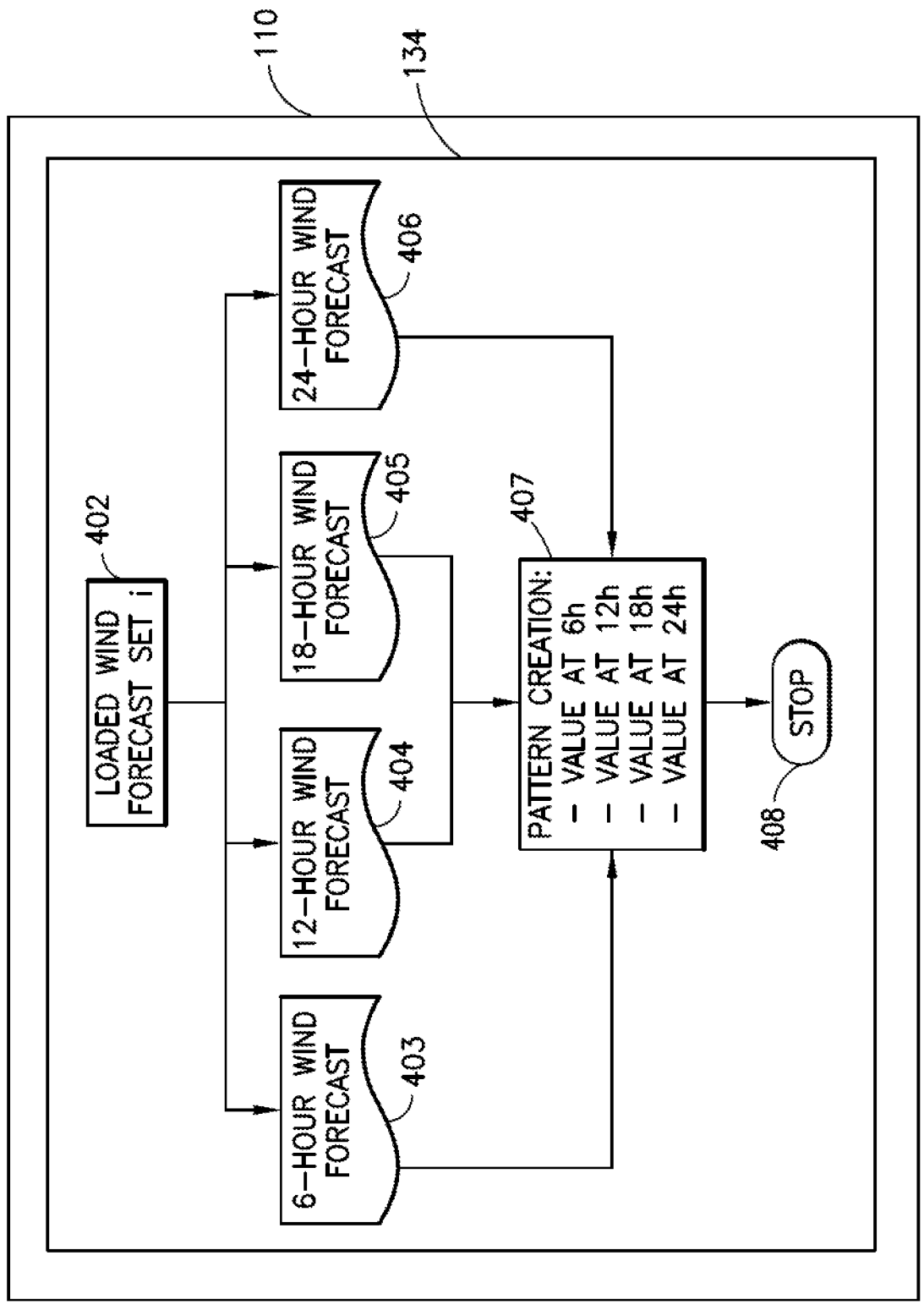
Figure 5:
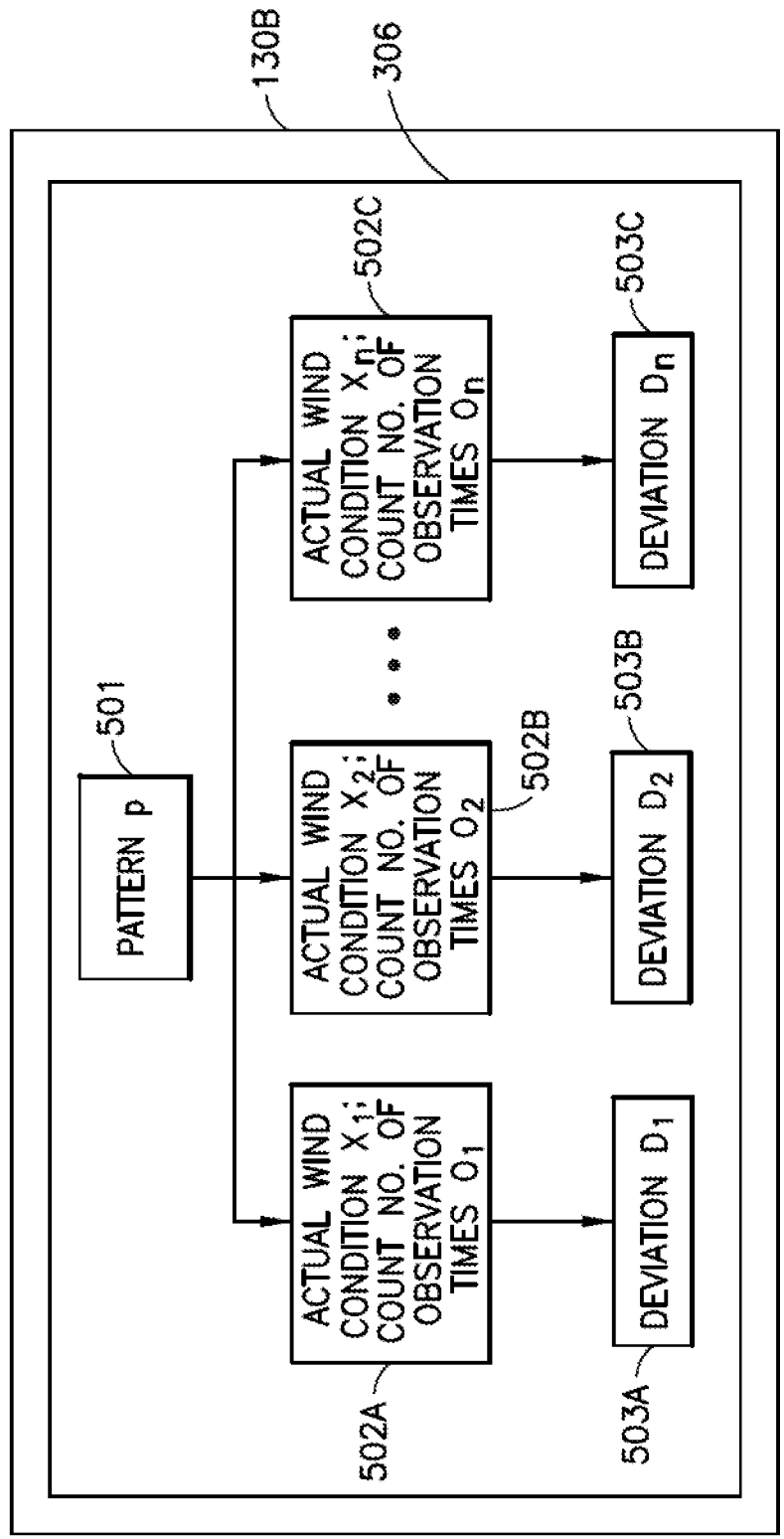
Figure 6:
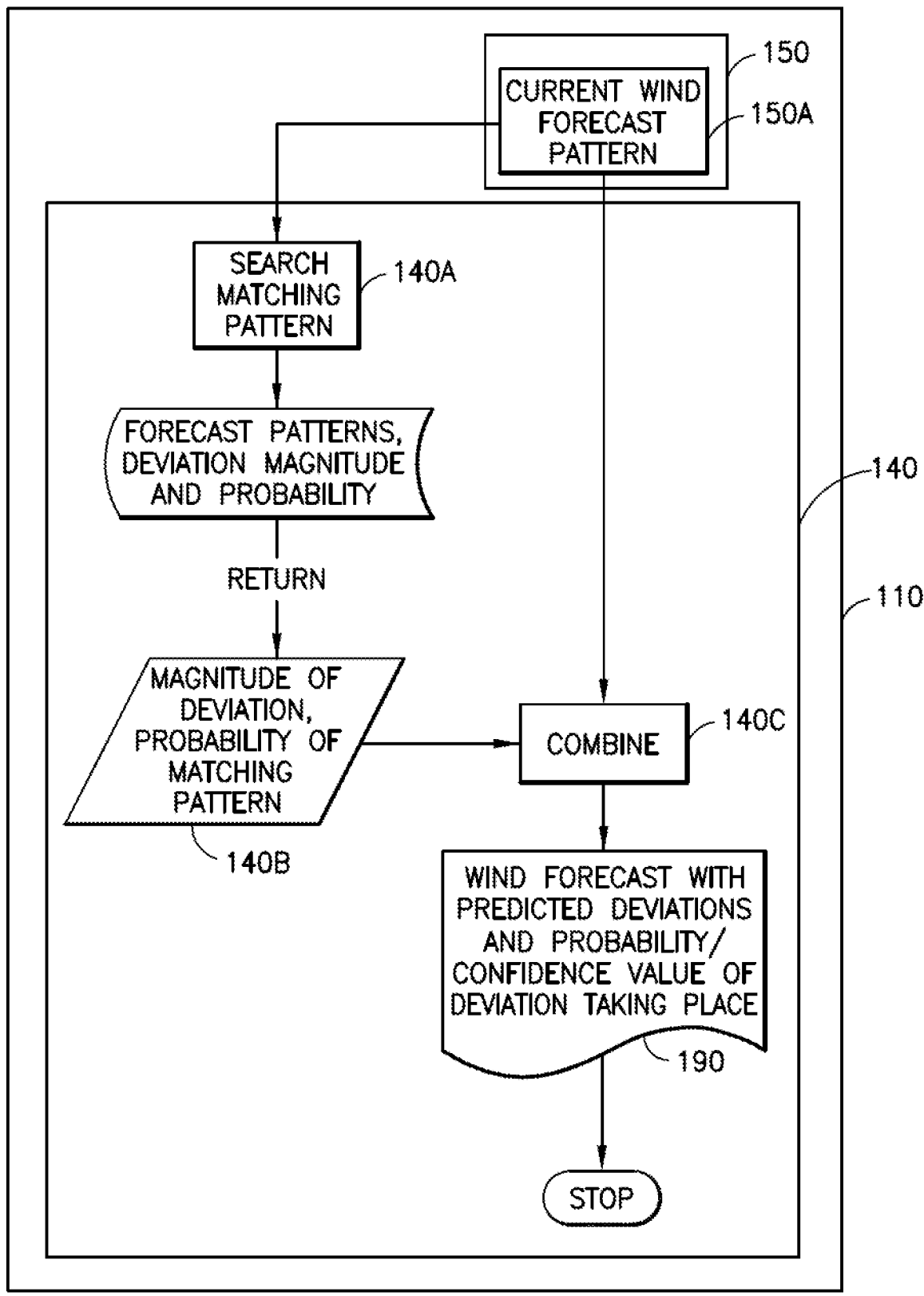
Figure 7:
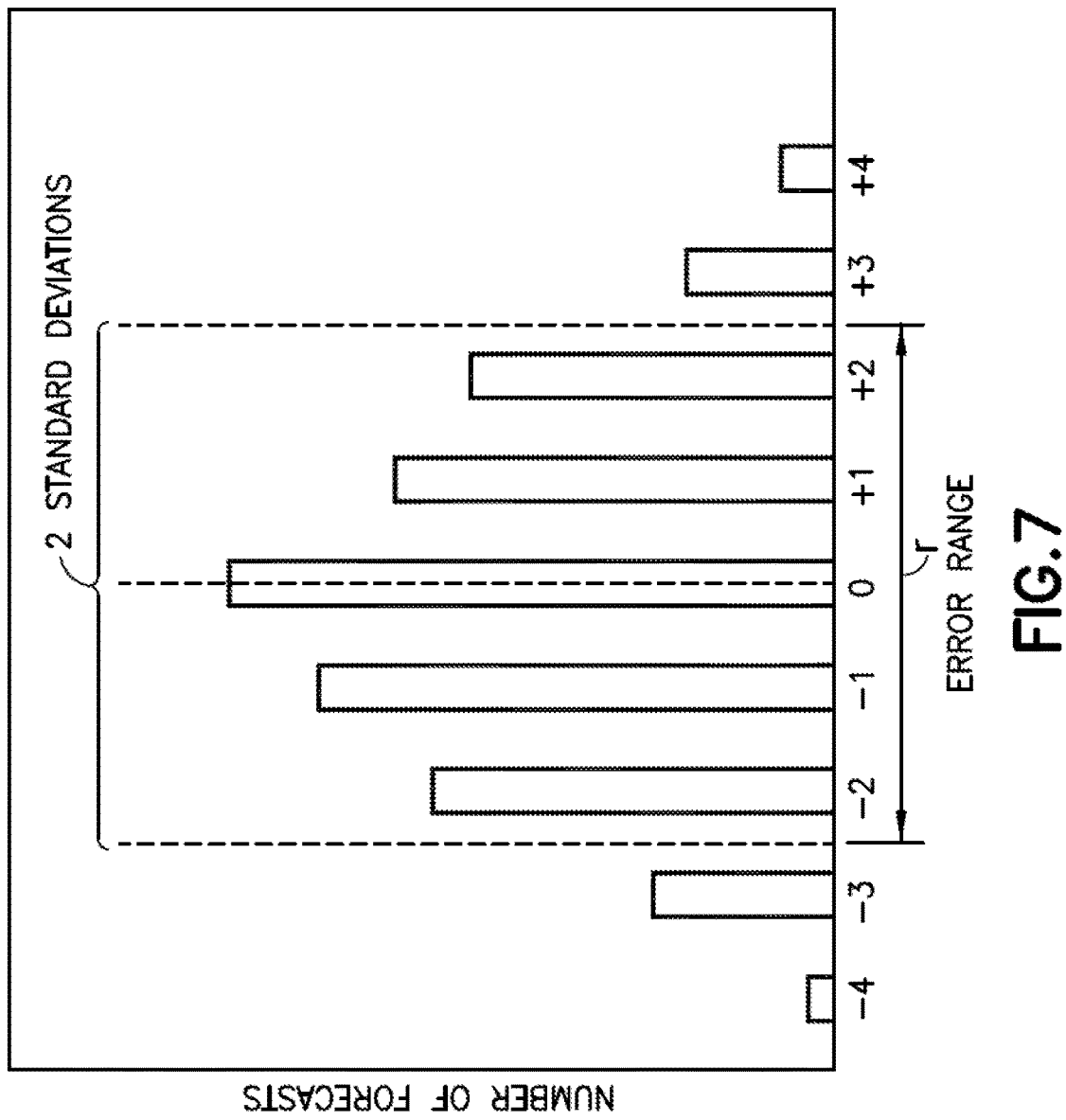
Figure 8:
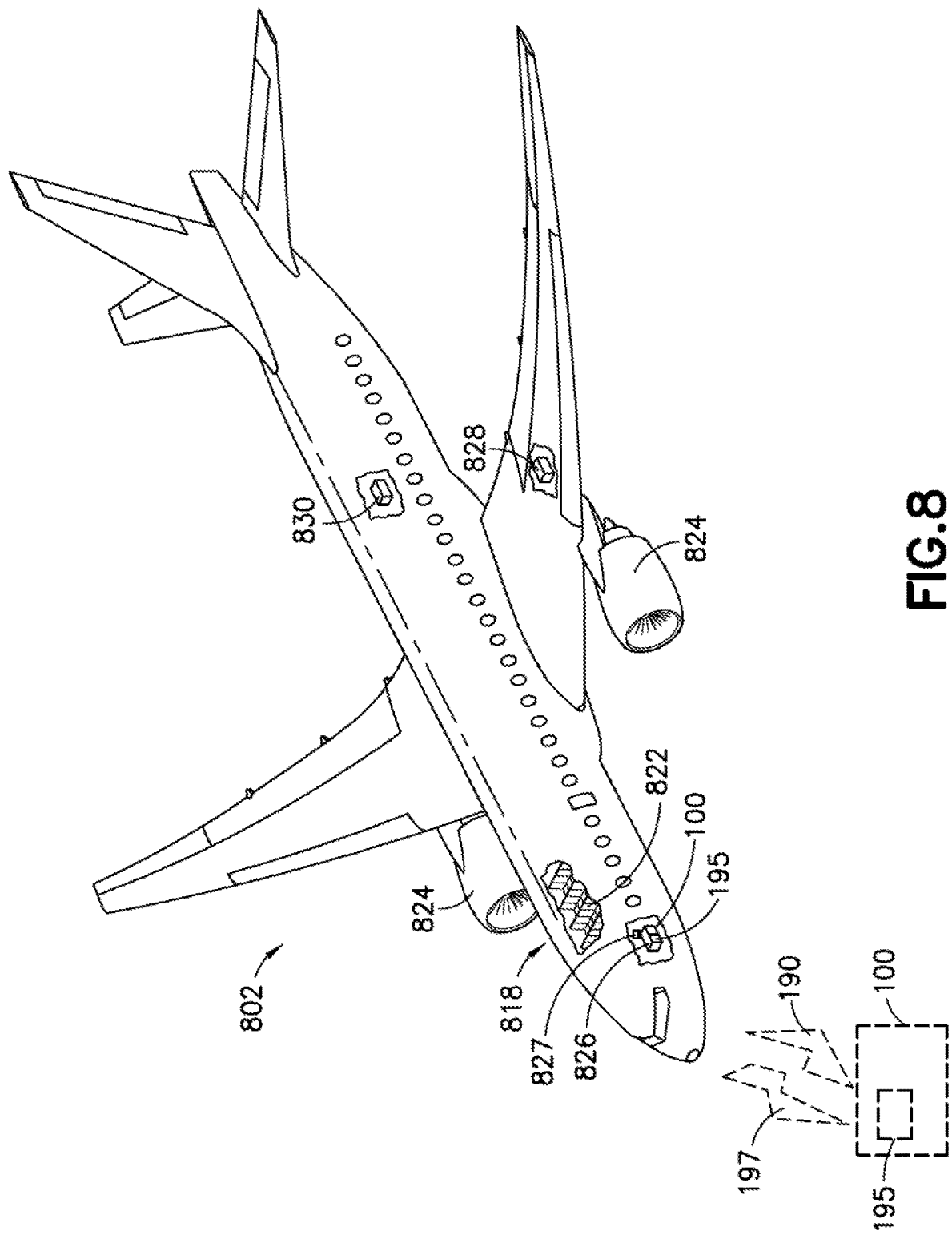

Having thus described examples of the disclosure in general terms, reference will now be made to the accompanying drawings, which are not necessarily drawn to scale, and wherein like reference characters designate the same or similar parts throughout the several views, and wherein:

FIG. 1 is an exemplary block diagram of a wind forecasting system according to aspects of the present disclosure;

FIG. 2 is an exemplary flow diagram of the operation of the wind forecasting system according to aspects of the present disclosure;

FIG. 3 is an exemplary flow diagram of a portions of the operation of the wind forecasting system according to aspects of the present disclosure;

FIG. 3A is an exemplary flow diagram of a portion of the operation of the wind forecasting system according to aspects of the present disclosure;

FIG. 4 is an exemplary flow diagram of a portion of the operation of the wind forecasting system according to aspects of the present disclosure;

FIG. 5 is an exemplary flow diagram of a portion of the operation of the wind forecasting system according to aspects of the present disclosure;

FIG. 6 is an exemplary flow diagram of a portion of the operation of the wind forecasting system according to aspects of the present disclosure;

FIG. 7 is an exemplary histogram of deviations according to aspects of the present disclosure;

FIG. 8 is a schematic illustration of an aircraft according to aspects of the present disclosure.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings or connections other than those depicted in the block diagrams may also exist. Dashed lines, if any, connecting the various elements and/or components represent couplings or connections similar in function and purpose to those represented by solid lines; however, couplings or connections represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of blown devices and/or processes have been omitted to avoid unnecessarily obscuring the disclosure. While some concepts will be described in conjunction with specific examples, it will be understood that these examples are not intended to be limiting. It is further noted that all numbers, temperatures, etc. are "about" and provided for exemplary purposes only. All specific numbers, temperatures and any other specific information may be more or less or any suitable number or temperature.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Referring to FIGS. 1-6, the aspects of the present disclosure described herein provide for a wind forecasting system 10 that improves forecasting results for a single most likely wind or weather forecast. The wind forecasting system 10 utilizes large historical wind forecast and re-analysis data to improve a current wind or weather forecast to predict the magnitude and likelihood of wind speed deviations to the current forecast. For example, in the field of aircraft flight planning, knowledge of the deviation between the current forecast and the actual wind speeds can result in improved flight plans, improve predictability and/or feature less deviation to the actual flown route. By improving flight plans, pilots can place greater confidence in wind or weather forecasts. Improved wind forecasts also provide for better calculation of extra contingency fuel, which reduces weight and reduces "cost-to-carry" in flight. In other fields, the improved forecasts generated by the wind forecasting system 10 can improve, for example, nautical navigation, recreational glider flights, wildfire fighting, scientific endeavors or weather forecasting in general.

Referring still to FIGS. 1-6, an exemplary block diagram of the wind forecasting system 10 and exemplary flow diagrams illustrating the operations of the wind forecasting system 10 in accordance with aspects of the present disclosure are shown. The aspects of the present disclosure provide for a wind forecasting system 10 that includes a wind forecast prediction apparatus 100 that is connected to a re-analysis data source 170, a historical wind forecast data source 175 and a current wind forecast source 180, as described in greater detail below, to generate a predicted wind forecast 190. In one aspect, the wind forecast prediction apparatus 100 is also connected to, or forms a part of, an aircraft flight planning controller 195, which receives the predicted wind forecast 190 and generates an aircraft flight plan 197 based on the predicted wind forecast 190 as will be described in greater detail below.

In one aspect, the wind forecast prediction apparatus 100 includes a memory 120 having a historical forecast data archive 160 and a processing backend 110 having a historical forecast patterns module 130, a wind forecast prediction module 140 and a current wind forecast module 150. In one aspect, the memory 120 is a non-volatile storage medium for data. In one aspect, the historical forecast data archive 160 further includes a re-analysis data store 160A configured to store data from the re-analysis data source 170 a historical wind forecast data store 160B configured to store data from historical wind forecast data source 175 and a historical wind forecast pattern store 160C configured to store historical wind forecast patterns as will be described in greater detail below.

In one aspect, the re-analysis data source 170 is a repository of a maximum amount of historical observations and measurements of wind and weather conditions available to re-run climate simulations. The re-analysis data source 170 includes, for example, temperature, wind speed and direction, humidity, air pressure and all other observable weather or wind conditions that are available for any predetermined geographic location at any predetermined time. In one aspect, the re-analysis data is generated by the Climate Forecast System Re-Analysis (CFSR) program from the National Centers for Environmental Prediction and National Center for Atmospheric Research (NCAR), or other suitable source of re-analysis data of observed wind or weather conditions. In one aspect, the re-analysis data is in any suitable meteorological data format, including, for example, Gridded Binary formats (e.g. GRIB, versions 0-2). In one aspect, the historical wind forecast data source 175 is a source or database of historical wind forecast data made in the past for any predetermined time or day for any predetermined geographic location. In one aspect, the historical wind forecast data source 175 includes, for example, public wind weather and wind forecasting data from the National Oceanic and Atmospheric Administration (NOAA), the National Weather Service (NWS), or private sources or data bases such as, for example, Accuweather. In one aspect, the historical wind forecast data from the historical wind forecast data source 175 is also provided in any suitable format, including, for example, the Gridded Binary formats described above.

In one aspect, the re-analysis data store 160A, the historical wind forecast data store 160B and the historical wind forecast pattern store 160C update at predetermined time periods. In other aspects, the re-analysis data store 160A, the historical wind forecast data store 160B and the historical wind forecast pattern store 160C update constantly through communications with the re-analysis data source 170 and the historical wind forecast data source 175.

As noted previously, the processing backend 110 of the wind forecast prediction apparatus 100 further includes the historical forecast patterns module 130, the wind forecast prediction module 140 and the current wind forecast module 150. In one aspect, the processing backend 110 is configured to generate a predicted wind forecast with the wind forecast prediction module 140 based on historical wind forecast patterns and actual wind values from the historical forecast patterns module 130 (based on data from the re-analysis data store 160A, the historical wind forecast data store 160B and the historical wind forecast pattern store 160C), as well as the current wind forecasts from the current wind forecast module 150 (based on data from the current wind forecast source 180).

In one aspect, the processor backend 110 is a dedicated weather forecasting controller or processor. In one aspect, the historical forecast patterns module 130, wind forecast prediction module 140 and current wind forecast module 150 are parts of the processing backend 110. In other aspects, the processor backend 110 is a cluster or network of controllers comprising of subprocessors 110A-110C dedicated to generating predicted wind forecasts 190. The subprocessors 110A-110C can be, for example, dedicated cores or dedicated groups of processors within the processing background 110. Each of the historical forecast patterns module 130, wind forecast prediction module 140 and current wind forecast module 150 is, in one aspect, a part of a respective subprocessor 110A-110C.

Referring still to FIGS. 1-6, in one aspect, the historical forecast patterns module 130 connects to and communicates with the re-analysis data store 160A and the historical wind forecast data store 160 of the historical forecast data archive 160. In one aspect, the historical forecast patterns module 130 is configured to generate at least one historical wind forecast pattern from the historical wind forecast data store 160B and determine a deviation magnitude and probability of occurrence of the historical wind forecast pattern based on actual wind values from the re-analysis data store 160A. In one aspect, the historical forecast patterns module 130 is also configured to include a forecast pattern generation submodule 130 and a deviation magnitude and probability submodule 130B. In one aspect, the forecast pattern generation submodule 130A is configured to receive historical wind forecast data from the historical wind forecast data store 160B and generate at least one historical wind forecast pattern based on the historical wind forecast data.

Referring now to FIG. 3, an exemplary flow diagram of the generation of the at least one historical wind forecast pattern is shown in accordance with aspects of the present disclosure. At block 131, the forecast pattern generation submodule 130A is initialized by the historical forecast patterns module 130. At blocks 132 and 133, each wind forecast set i (each consisting of, for example, a daily wind forecast) within the historical wind forecast data store 160B is loaded by the historical forecast patterns module 130. In one aspect, the wind forecast set i is defined as a wind forecast for a predetermined day having one or more subforecasts corresponding to a predetermined forecast interval for that predetermined day at a predetermined geographic location. For exemplary purposes, the wind forecast set i is defined has having four subforecasts 403-406 (see FIG. 4), each subforecast 403-406 corresponding to a 6 hour forecast interval. In other aspects, the wind forecast set i has any suitable number of subforecasts covering any suitable predetermined forecast interval, including, for example, 6 subforecasts (having 4 hour forecast intervals), 12 subforecasts (having two hour forecast intervals), 24 subforecasts (having hourly forecast intervals) or 48 subforecasts (having half-hourly forecast intervals).

At block 134, each wind forecast set i within the historical wind forecast data store 160B is converted into a wind forecast pattern that is stored in the historical wind forecast pattern store 160C. The generation of the numerical wind forecast pattern by the historical forecast patterns module 130 is illustrated in FIG. 4 in accordance with aspects of the present disclosure. At block 402, the wind forecast set i is loaded by the historical forecast patterns module 130. At block 407, for each of the subforecasts 403-406, a numerical wind value is generated based on the subforecasts 403-406. The sequence of numerical wind values corresponding to each of the subforecasts 403-406 defines the wind forecast pattern.

Referring back to FIG. 3, for each of the wind forecast patterns corresponding to wind forecast set i generated by the historical forecast patterns module 130 at block 134, in one aspect, the historical forecast patterns module 130 further determines if the wind forecast pattern for the wind forecast set i matches a historical wind forecast pattern p that has already been stored within the historical wind forecast pattern store 160C at block 135. In one aspect, at block 136, if the wind forecast pattern for the wind forecast set i does not match any other historical wind forecast patterns p already stored within the historical wind forecast pattern store 160C, then the wind forecast pattern is stored in the historical wind forecast pattern store 160C as a new historical wind forecast pattern p. In one aspect, the wind forecast pattern for wind forecast set i is stored in the historical wind forecast pattern store 160C along with a forecast date and time T as well as a geographic location corresponding to the wind forecast set i. Further, an entry count j corresponding to the historical wind forecast pattern p is set to 1.

In one aspect, at block 137, if the wind forecast pattern for wind forecast set i matches a historical wind forecast pattern p stored in the historical wind forecast pattern store 160C, then the wind forecast pattern is stored as an entry of the historical wind forecast pattern p within the historical wind forecast pattern store 160C. The entry count j for the historical wind forecast pattern p stored within the historical wind forecast pattern store 160C is also incremented by one. The forecast date and time T of the wind forecast pattern for the wind forecast set i is stored as part of the entry of the matching historical wind forecast pattern p within the historical wind forecast pattern store 160C along with a geographic location corresponding to the wind forecast set i. At block 138, the historical forecast patterns module 130 increments through the wind forecasts sets i until there are no more wind forecast sets i left to generate wind forecast patterns from (see block 139). If there are any additional wind forecast sets i+1, then the forecast pattern generation submodule 130A increments i by 1 and repeats the process as shown in FIG. 3.

Referring back to FIGS. 1 and 2, after the pattern generation operation performed by the forecast pattern generation submodule 130A is complete, the deviation magnitude and probability submodule 130B generates the deviation magnitude and probability for each of the historical wind forecast patterns p stored in the historical wind forecast pattern store 160C. Referring now to FIGS. 3A and 5, an exemplary flow diagram for the generation of the deviation magnitude and probability for each historical wind forecast pattern p in the historical wind forecast pattern store 160C relative to actual wind values stored in the re-analysis data store 160A is shown in accordance with aspects of the present disclosure. At block 302, the deviation magnitude and probability submodule 130B is initialized and each historical wind forecast pattern p stored within the historical wind forecast pattern store 160C is loaded. In one aspect, each historical wind forecast pattern p has the entry count j, as well as one or more date and time $T_j$ corresponding to each of the j wind forecast patterns associated with historical wind forecast pattern p. At block 303, each historical wind forecast pattern p is loaded with the entry count j at date and time $T_j$. At block 304, the deviation magnitude and probability submodule 130B searches for an actual wind value at a date and time corresponding to $T_j$ within the re-analysis data store 160A. At block 306, in one aspect, the deviation magnitude and probability submodule 130B determines a quantitative deviation D between the actual wind value at the date and time corresponding to $T_j$ and the entry of the historical wind forecast pattern p at date and time $T_j$ and save the quantitative difference within the historical wind forecast pattern store 160C for the entry corresponding with the date and time of $T_j$. At block 307-308, this process is repeated by the deviation magnitude and probability submodule 130B for each entry count j of the historical wind forecast pattern p and for each date and time $T_j$ until no historical wind forecast patterns p are left (block 309).

Referring now to FIG. 5, in one aspect, the deviation magnitude and probability submodule 130B also tracks the number of observations O for each quantitative deviation D with each historical wind forecast pattern p. In one aspect, the number of observations O for each quantitative deviation D is tracked by the deviation magnitude and probability submodule 130B during the process shown in FIG. 3A as described above. In one aspect, for every entry count j of a historical wind forecast pattern p stored within the historical wind pattern store 160A (see block 501), the actual wind value is returned from the re-analysis data store 160A and the deviation D is calculated. At blocks 502A-C, an actual wind condition X is calculated for each of the j entries. In one aspect, the same wind condition X may be observed more than once, so the deviation magnitude and probability submodule 130B further tracks the number of observations O of the actual wind condition X as part of the historical wind forecast pattern store 160C. The difference between the historical wind forecast pattern p and actual wind value at $T_j$ is calculated as the quantitative deviation D as described above (see block 503A-C and block 306). In one aspect, the number of observations O corresponds with a probability of occurrence for each quantitative deviation D with respect to each historical wind forecast pattern p. For example, in one aspect, the probability that a certain deviation D will be encountered is calculated by dividing the appropriate observation count O for a particular deviation D by the overall sum of all observations and multiplying by 100. In one aspect, the quantitative deviation D also defines the magnitude of deviation.

In one aspect, it is understood that the generation of the at least one historical wind forecast pattern p and determining the deviation magnitude and probability of occurrence of the historical wind forecast pattern p does not need to be performed every time the historical forecast patterns module 130 runs. In one aspect, the at least one historical wind forecast pattern store 160C is updated at predetermined time intervals, including, for example, daily, weekly or monthly time intervals.

Referring again to FIGS. 1 and 2, the current wind forecast pattern module 150 is connected to the current wind forecast source 180. In one aspect, the current wind forecast source 180 is any suitable forecasting source including, for example, the National Oceanic and Atmospheric Administration or the National Weather Service, or private sources such as Accuweather. In one aspect, the current wind forecast pattern module 150 receives a current wind forecast 180A from the current wind forecast source 180. In one aspect, the current wind forecast 180A is any arbitrary forecast of which possible deviations can be predicted. In one aspect, the current wind forecast 180A is also stored a suitable format such as the GRIB format as described above. In one aspect, the current wind forecast pattern module 150 is configured to generate a current wind forecast pattern 150A based on the current wind forecast 180A in a substantially similar process as shown in FIG. 4.

Referring to FIGS. 1-2 and 6, the wind forecast prediction module 140 is configured to receive the current wind forecast pattern 150A and, based on the historical wind forecast patterns p stored in the historical wind forecast pattern store 160C, generates a predicted wind forecast 190 that improves the current wind forecast 180A received from the current wind forecast source 180 by providing a deviation magnitude for the current wind forecast 180A and a predetermined degree of confidence. The wind forecast prediction module 140 includes a pattern matching submodule 140A, a current deviation magnitude and probability submodule 140B and a combine submodule 140C. The wind forecast prediction module 140 receives the current wind forecast pattern 150A from the current wind forecast module 150. In one aspect, the pattern matching submodule 140A searches the historical wind forecast pattern store 160C and determines a matching historical wind forecast pattern p that matches the current wind forecast pattern 150A. In one aspect, the current deviation magnitude and probability submodule 140B generates the magnitude of deviation as well as the probability for matching historical wind forecast pattern p that matches the current wind forecast pattern 150A. In other aspects, if no matching historical wind forecast pattern p is found, then the wind forecast prediction module 140 will not provide a deviation magnitude and a degree of confidence for the current wind forecast 180A. In yet other aspects, if no matching historical wind forecast pattern p is found by the pattern matching submodule 140A, the pattern matching submodule 140A will also look at historical wind forecast patterns p that substantially match the current wind forecast pattern 150A within a predetermined tolerance (e.g., is not an exact match, for example, where 3 of the 4 subforecasts making up the historical wind forecast pattern p matches that of the current wind forecast pattern 150A). Here, the tolerance is described as 3 out of 4 subforecasts matching, but in other aspects, any suitable tolerance may be used.

In one aspect, the combine submodule 140C combines the current deviation magnitude and probability for the matching historical wind forecast pattern p with the current wind forecast 180 to generate the improved predicted wind forecast 190 having the deviation magnitude and the predetermined degree of confidence. In one aspect, the combine submodule 140C is configured to determine the error range based on the matching historical wind forecast pattern by calculating the probability of the deviation magnitude within a normal confidence interval of a two sigma environment. Referring to FIG. 7, in one aspect, where the current wind forecast pattern 150A matches a matching historical wind forecast pattern p, the different deviations D for the matching historical wind forecast pattern p are plotted in a distribution/histogram 700 according to the number of observations O for each deviation D. The distribution/histogram 700 of the deviations D can be employed, for example, to determine a deviation range r of deviations D that falls within a two sigma (e.g., two standard deviations) confidence interval. Within this two sigma interval, there is about a 95% likelihood or probability of the deviations Ds taking place within this deviation range r. The true to-be-expected wind value will fall likely within the deviation range r with about 95% likelihood. By adjusting the current wind forecast 180A with the current deviation magnitude and probability and distribution/histogram 700 (see FIG. 7), the combine submodule 140C generates a predicted wind forecast 190 that include the deviation range r with about 95% confidence that the true to-be-expected wind values will fall within the deviation range r. By using historical wind forecasts and historical actual wind data from historical wind forecast data source 175 and the re-analysis data source 170, the predicted wind forecast 190 has an augmented confidence in the result due to the predicted wind forecast 190 having or being based on higher statistical relevance.

Referring again to FIGS. 1 and 2, in one aspect, the predicted wind forecast 190 allows for improved wind and weather forecasts that provide for, for example, improved applications in the aeronautical, nautical, agricultural, firefighting, scientific or other suitable fields. For example, in the field of aeronautics, the predicted wind forecast 190 is communicated to an aircraft flight planning controller 195 having an aircraft flight planning controller processor 197. The aircraft flight planning controller processor 197 is configured to generate an aircraft flight plan 197. In one aspect, the aircraft flight plan 197 includes the calculated trajectory of an aircraft path. In one aspect, the aircraft flight plan 197 also includes fuel contingencies. In one aspect, with the predicted wind forecast 190, the aircraft flight planning controller processor 197 can minimize the "cost-to-carry" for fuel contingencies. In one aspect, the predicted wind forecast 190 also provides for flight plans with less deviation from the actual flown route, less actual fuel use and more accurate flight-time estimates. In one aspect, the predicted wind forecast 190 also provides for more reliable prediction of adverse weather (e.g., high winds) as well as possible re-routing in case where airports are closed due to Instrument Meteorological Conditions (where pilots are reliant on instruments only due to inclement weather conditions). In one aspect, the aircraft flight planning controller 195 is a separate controller. However, as can be seen in FIG. 1, the aircraft flight planning controller 195 is a module of the processing backend 110. In other aspects, other controllers (not shown) can generate, for example, hang-gliding or ballooning wind maps, wildfire wind maps, maritime wind maps, agricultural weather forecasts or any other suitable forecasts or weather maps.

Examples of the disclosure may be described in the context of an aircraft 802 as shown in FIG. 8. The aircraft 802 includes an airframe 818 with a plurality of high-level systems and an interior 822. Examples of high-level systems include one or more of a propulsion system 824, a flight computing system 826, an electrical system 827, a hydraulic system 828, and an environmental system 830. Any number of other systems may be included. In one aspect, the wind forecast prediction apparatus 100 is part of the aircraft 802, for example, as part of the flight computer 826. In other aspects, the wind forecast prediction apparatus 100 is terrestrial and communicates a predicted wind forecast 190 to the flight planning controller 195 onboard the aircraft 802 as part of the flight computer system 826. In other aspects, the wind forecast prediction apparatus 100 includes the flight planning controller and is configured to communicate the aircraft flight plan 197 to flight computing system 826 onboard the aircraft 802. Although an aerospace example is shown, the principles of the present disclosure may be applied to other industries, such as those described herein.

In one or more aspects of the present disclosure, a wind forecast prediction apparatus includes an historical forecast patterns module configured to generate at least one historical wind forecast pattern and determine a deviation magnitude and a probability of occurrence of the at least one historical wind forecast pattern based on at least one actual wind value corresponding to the at least one historical wind forecast pattern; a current wind forecast module; and a wind forecast prediction controller connected to each of the historical forecast patterns module and the current wind forecast module, the wind forecast prediction controller is configured to generate a current wind forecast pattern based on current wind data from the current wind forecast module; and determine a matching historical wind forecast pattern from the at least one historical wind forecast pattern that matches the current wind forecast pattern, where the deviation magnitude and the probability of occurrence of the matching historical wind forecast pattern are combined with the current wind forecast pattern to generate a predicted wind forecast.

In one or more aspects of the present disclosure, the wind forecast prediction controller is configured to generate an aircraft flight plan based on the predicted wind forecast.

In one or more aspects of the present disclosure, the predicted wind forecast is within a normal confidence interval of a two-sigma environment.

In one or more aspects of the present disclosure, the historical forecast patterns module is configured to update the at least one historical wind forecast pattern and determine the deviation magnitude and the probability of occurrence of the at least one historical wind forecast pattern at predetermined time intervals.

In one or more aspects of the present disclosure, the deviation magnitude of the at least one historical wind forecast pattern is determined by the historical forecast patterns module based on a quantitative difference between the at least one historical wind forecast pattern and the corresponding at least one actual wind value from the historical forecast patterns module.

In one or more aspects of the present disclosure, the probability of occurrence of the at least one historical wind forecast pattern is determined by the historical forecast patterns module based on a count of occurrences of the at least one historical wind forecast pattern.

In one or more aspects of the present disclosure, the historical forecast patterns module includes historical wind forecast data and the at least one actual wind value data.

In one or more aspects of the present disclosure, wherein the at least one historical wind forecast pattern and the current wind forecast pattern each further comprise more than one sub-forecasts, each of the more than one sub-forecasts correspond to at least one predetermined forecast interval.

In one or more aspects of the present disclosure, the aircraft flight planning controller is configured to determine the matching historical wind forecast pattern based on matching each of the more than one sub-forecasts of the at least one historical wind forecast pattern with each of the more than one sub-forecasts of the current wind forecast pattern.

In one or more aspects of the present disclosure, wherein the wind forecast prediction controller is configured to determine the matching historical wind forecast pattern based on matching a plurality of the more than one sub-forecasts of the at least one historical wind forecast pattern with the more than one sub-forecasts of the current wind forecast pattern.

In one or more aspects of the present disclosure, a wind forecast prediction method, the method includes generating at least one historical wind forecast pattern with an historical forecast patterns module; determining a deviation magnitude and a probability of occurrence of the at least one historical wind forecast pattern, with the historical forecast patterns module, based on at least one actual wind value corresponding to the at least one historical wind forecast pattern; generating, with a wind forecast prediction controller, a current wind forecast pattern based on current wind data from a current wind forecast module; determining, with the wind forecast prediction controller, a matching historical wind forecast pattern from the at least one historical wind forecast pattern that matches the current wind forecast pattern; and generating a predicted wind forecast with the wind forecast prediction controller by combining the deviation magnitude and the probability of occurrence of the matching historical wind forecast pattern with the current wind forecast pattern.

In one or more aspects of the present disclosure, the method further comprising generating an aircraft flight plan based on the predicted wind forecast with an aircraft flight planning controller.

In one or more aspects of the present disclosure, the predicted wind forecast is within a normal confidence interval of a two-sigma environment.

In one or more aspects of the present disclosure, the method further comprising updating the at least one historical wind forecast pattern, with the historical forecast patterns module, and determining, with the historical forecast patterns module, the deviation magnitude and the probability of occurrence of the at least one historical wind forecast pattern at predetermined time intervals.

Tn one or more aspects of the present disclosure, the method further comprising calculating, with the historical forecast patterns module, the deviation magnitude of the at least one historical wind forecast pattern based on a quantitative difference between the at least one historical wind forecast pattern and the corresponding at least one actual wind value from the historical forecast patterns module.

In one or more aspects of the present disclosure, the method further comprising calculating, with the historical forecast patterns module, the probability of occurrence of the at least one historical wind forecast pattern by counting occurrences of the at least one historical wind forecast pattern.

In one or more aspects of the present disclosure, a method for generating a wind forecast, the method includes generating at least one historical wind forecast pattern with an historical forecast patterns module, each of the at least one historical wind forecast pattern being based on at least one historical wind forecast from the historical forecast patterns module; determining a deviation magnitude and a probability of occurrence of the at least one historical wind forecast pattern, with the historical forecast patterns module, based on an actual wind value corresponding to each of the at least one historical wind forecasts associated with the at least one historical wind forecast pattern; generating, with controller wind forecast prediction controller, a current wind forecast pattern based on current wind data from a current wind forecast module; determining, with the wind forecast prediction controller, a matching historical wind forecast pattern from the at least one historical wind forecast pattern that matches the current wind forecast pattern; and generating a predicted wind forecast with the wind forecast prediction controller by combining the deviation magnitude and the probability of occurrence of the matching historical wind forecast pattern with the current wind forecast pattern.

In one or more aspects of the present disclosure, the method further comprising generating an aircraft flight plan with an aircraft flight planning controller based on the predicted wind forecast In one or more aspects of the present disclosure, the predicted wind forecast is within a normal confidence interval of a two-sigma environment.

In one or more aspects of the present disclosure, the method further comprising calculating, with the historical forecast patterns module, the deviation magnitude of the at least one historical wind forecast pattern based on a quantitative difference between the at least one historical wind forecast pattern and the corresponding at least one actual wind value from the historical forecast patterns module.

In one or more aspects of the present disclosure, the method further comprising calculating, with the historical forecast patterns module, the probability of occurrence of the at least one historical wind forecast pattern by counting occurrences of the at least one historical wind forecast pattern.

In one or more aspects of the present disclosure, the method further comprising updating, with the historical forecast patterns module, the at least one historical wind forecast pattern and determining, with the historical forecast patterns module, the deviation magnitude and the probability of occurrence of the at least one historical wind forecast pattern at predetermined time intervals.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A wind forecast prediction apparatus comprising:
   an historical forecast patterns module configured to generate at least one historical wind forecast pattern and determine a deviation magnitude and a probability of reoccurrence of the at least one historical wind forecast pattern based on at least one actual wind value corresponding to the at least one historical wind forecast pattern, where the deviation magnitude is a quantitative difference between the at least one actual wind value for a given date and time and an entry of the at least one historical wind forecast pattern for the given date and time;
   a current wind forecast module; and
   a wind forecast prediction controller connected to each of the historical forecast patterns module and the current wind forecast module, the wind forecast prediction controller is configured to
     generate a current wind forecast pattern based on current wind data from the current wind forecast module; and
     determine a matching historical wind forecast pattern from the at least one historical wind forecast pattern that matches the current wind forecast pattern, where the deviation magnitude and the probability of reoccurrence of the matching historical wind forecast pattern are combined with the current wind forecast pattern to generate a predicted wind forecast.

2. The wind forecast prediction apparatus of claim 1, wherein the wind forecast prediction controller is configured to generate an aircraft flight plan based on the predicted wind forecast.

3. The wind forecast prediction apparatus of claim 1, wherein the predicted wind forecast is within a normal confidence interval of a two-sigma environment.

4. The wind forecast prediction apparatus of claim 1, wherein the historical forecast patterns module is configured to update the at least one historical wind forecast pattern and determine the deviation magnitude and the probability of reoccurrence of the at least one historical wind forecast pattern at predetermined time intervals.

5. The wind forecast prediction apparatus of claim 1, wherein the deviation magnitude of the at least one historical wind forecast pattern is determined by the historical forecast patterns module for each of the at least one historical wind forecast pattern based on the quantitative difference between the entry of each of the at least one historical wind forecast pattern and the corresponding at least one actual wind value from the historical forecast patterns module.

6. The wind forecast prediction apparatus of claim 1, wherein the probability of reoccurrence of the at least one historical wind forecast pattern is determined by the historical forecast patterns module based on a count of occurrences of the at least one historical wind forecast pattern.

7. The wind forecast prediction apparatus of claim 1, wherein the historical forecast patterns module includes historical wind forecast data and the at least one actual wind value data.

8. The wind forecast prediction apparatus of claim 1, wherein the at least one historical wind forecast pattern and the current wind forecast pattern each further comprise more than one sub-forecasts, each of the more than one sub-forecasts correspond to at least one predetermined forecast interval.

9. The wind forecast prediction apparatus of claim 8, wherein the aircraft flight planning controller is configured to determine the matching historical wind forecast pattern based on matching each of the more than one sub-forecasts of the at least one historical wind forecast pattern with each of the more than one sub-forecasts of the current wind forecast pattern.

10. The wind forecast prediction apparatus of claim 8, wherein the wind forecast prediction controller is configured to determine the matching historical wind forecast pattern based on matching a plurality of the more than one sub-forecasts of the at least one historical wind forecast pattern with the more than one sub-forecasts of the current wind forecast pattern.

11. A wind forecast prediction method, the method comprising:
    generating at least one historical wind forecast pattern with an historical forecast patterns module;
    determining a deviation magnitude and a probability of reoccurrence of the at least one historical wind forecast pattern, with the historical forecast patterns module, based on at least one actual wind value corresponding to the at least one historical wind forecast pattern, where the deviation magnitude is a quantitative difference between the corresponding at least one actual wind value for a given date and time and an entry of the at least one historical wind forecast pattern for the given date and time;
    generating, with a wind forecast prediction controller, a current wind forecast pattern based on current wind data from a current wind forecast module;
    determining, with the wind forecast prediction controller, a matching historical wind forecast pattern from the at least one historical wind forecast pattern that matches the current wind forecast pattern; and
    generating a predicted wind forecast with the wind forecast prediction controller by combining the deviation magnitude and the probability of reoccurrence of the matching historical wind forecast pattern with the current wind forecast pattern.

12. The wind forecast prediction method of claim 11, further comprising generating an aircraft flight plan based on the predicted wind forecast with an aircraft flight planning controller.

13. The wind forecast prediction method of claim 11, wherein the predicted wind forecast is within a normal confidence interval of a two-sigma environment.

14. The wind forecast prediction method of claim 11, further comprising updating the at least one historical wind forecast pattern, with the historical forecast patterns module, and determining, with the historical forecast patterns module, the deviation magnitude and the probability of reoccurrence of the at least one historical wind forecast pattern at predetermined time intervals.

15. The wind forecast prediction method of claim 11, further comprising calculating, with the historical forecast patterns module, the deviation magnitude of each of the at least one historical wind forecast pattern based on the quantitative difference between the entry of each of the at least one historical wind forecast pattern and the corresponding at least one actual wind value from the historical forecast patterns module.

16. The wind forecast prediction method of claim 11, further comprising calculating, with the historical forecast patterns module, the probability of reoccurrence of the at least one historical wind forecast pattern by counting occurrences of the at least one historical wind forecast pattern.

17. A method for generating a wind forecast, the method comprising generating at least one historical wind forecast pattern with an historical forecast patterns module, each of the at least one historical wind forecast pattern being based on at least one historical wind forecast from the historical forecast patterns module;

determining a deviation magnitude and a probability of reoccurrence of the at least one historical wind forecast pattern, with the historical forecast patterns module, based on an actual wind value corresponding to each of the at least one historical wind forecasts associated with the at least one historical wind forecast pattern, where the deviation magnitude is a quantitative difference between the actual wind value for a given date and time and an entry of the at least one historical wind forecast pattern for the given date and time;

generating, with controller wind forecast prediction controller, a current wind forecast pattern based on current wind data from a current wind forecast module; and determining, with the wind forecast prediction controller, a matching historical wind forecast pattern from the at least one historical wind forecast pattern that matches the current wind forecast pattern; and generating a predicted wind forecast with the wind forecast prediction controller by combining the deviation magnitude and the probability of reoccurrence of the matching historical wind forecast pattern with the current wind forecast pattern.

18. The method for generating a wind forecast of claim 17, further comprising calculating, with the historical forecast patterns module, the deviation magnitude of each of the at least one historical wind forecast pattern based on a quantitative difference between each of the at least one historical wind forecast pattern and the corresponding at least one actual wind value from the historical forecast patterns module.

19. The method for generating a wind forecast of claim 17, further comprising calculating, with the historical forecast patterns module, the probability of reoccurrence of the at least one historical wind forecast pattern by counting occurrences of the at least one historical wind forecast pattern.

20. The method for generating a wind forecast of claim 17, further comprising updating, with the historical forecast patterns module, the at least one historical wind forecast pattern and determining, with the historical forecast patterns module, the deviation magnitude and the probability of reoccurrence of the at least one historical wind forecast pattern at predetermined time intervals.

* * * * *